United States Patent
Luo et al.

(10) Patent No.: US 10,216,844 B2
(45) Date of Patent: Feb. 26, 2019

(54) GRAPHICAL INTERFACE PRESENTATION OF SEARCH RESULTS

(71) Applicant: EXCALIBUR IP, LLC, Sunnyvale, CA (US)

(72) Inventors: Jie Luo, Mountain View, CA (US); Yi Chang, Sunnyvale, CA (US); Scott Gaffney, Palo Alto, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 345 days.

(21) Appl. No.: 14/497,591

(22) Filed: Sep. 26, 2014

(65) Prior Publication Data

US 2016/0092563 A1 Mar. 31, 2016

(51) Int. Cl.
*G06F 17/30* (2006.01)
*G06F 3/0483* (2013.01)
*G06F 3/0488* (2013.01)

(52) U.S. Cl.
CPC ...... *G06F 17/30864* (2013.01); *G06F 3/0483* (2013.01); *G06F 3/0488* (2013.01); *G06F 17/30554* (2013.01)

(58) Field of Classification Search
CPC ......... G06F 17/30864; G06F 17/30554; G06F 3/0483; G06F 3/0488; G06F 17/30
See application file for complete search history.

(56) References Cited

U.S. PATENT DOCUMENTS

| | | | | |
|---|---|---|---|---|
| 7,765,225 | B2* | 7/2010 | Robert | G06F 17/3064 707/765 |
| 2009/0228825 | A1* | 9/2009 | Van Os | G06F 3/0488 715/780 |
| 2009/0234834 | A1* | 9/2009 | Cozzi | G06F 17/30867 |
| 2010/0105370 | A1* | 4/2010 | Kruzeniski | G06F 3/0482 455/414.3 |
| 2012/0311632 | A1* | 12/2012 | Hill | H04N 21/4622 725/40 |
| 2013/0204892 | A1* | 8/2013 | Kumaran | G06F 17/30864 707/766 |
| 2014/0195337 | A1* | 7/2014 | Taylor | G06Q 30/0277 705/14.45 |
| 2014/0210729 | A1* | 7/2014 | Chattopadhyay | G06F 3/0416 345/173 |
| 2014/0358934 | A1* | 12/2014 | Hirose | G06F 17/30445 707/741 |
| 2014/0372218 | A1* | 12/2014 | Talluri | G06Q 30/0256 705/14.54 |
| 2015/0038161 | A1* | 2/2015 | Jakobson | H04W 4/02 455/456.1 |

* cited by examiner

*Primary Examiner* — Ashish Thomas
*Assistant Examiner* — Dustin D Eyers
(74) *Attorney, Agent, or Firm* — Cooper Legal Group, LLC

(57) ABSTRACT

A system and/or technique for graphical interface presentation comprises receiving a search string and presenting a search result series to a user on a client device. Search results of the search result series are presented in the form of cards, where a first card comprises information associated with a first search result of the search result series and a second card comprises information associated with a second search result of the search result series. A user may navigate through the cards to view various search results.

20 Claims, 11 Drawing Sheets

GRAPHICAL INTERFACE PRESENTATION OF SEARCH RESULTS

BACKGROUND

Users often use search engines to identify web pages or other content of interest to the user. The user begins a search by entering a word or phrase, often referred to as a search string, into a text field of the search engine. The search engine uses the search string to identify content that is relevant to the search string. The identified content, referred to as search results, is generally presented as a list, where each entry in the list corresponds to a different search result or different webpage. The entries are typically arranged based upon relevance, where relevance may be determined based upon how closely the search result matches the entry, a click-through rate for the search result, the amount of content that links to the search result, etc. A search result may include a title of the webpage, an extracted portion of the webpage, etc., and the user may scroll through the one or more search results to locate a search result of interest or may refine the search string to view other search results.

SUMMARY

In accordance with the present disclosure, a search string may be received. A search result series comprising one or more search results may be presented to a user on a client device responsive to receiving the search string. The search result series may be presented as a set of cards, where respective cards comprise information associated with a search result. For example, a first card may comprise a title associated with a first search result and a summary associated with the first search result and a second card may comprise a title associated with a second search result and a summary associated with the second search result.

Users may navigate through the set of cards (e.g., flipping between cards in a rolodex-style fashion) using a reorder gesture. In some embodiments, the reorder gesture may correspond to a defined motion of the device, which can be detected via a gyroscope, an accelerometer, or other motion sensing component of the client device. In some embodiments, the reorder gesture may correspond to a defined touch gesture, which can be detected via a touch sensitive component of the client device. In still other embodiments, other gestures may be defined as a reorder gesture. For example, a front-facing camera may be configured to detect eye motion, and the reorder gesture may correspond to a defined eye motion (e.g., looking to the left or the right of the display).

In some embodiments, at least some of the cards may have a front face and a back face. The front face, which is initially presented when a card is displayed, may comprise the title of the search result, a summary of the search result, and/or other primary information. The back face, which is initially concealed when the card is displayed, may comprise additional information about the search result such as the last time the webpage was updated, a map showing a location corresponding to the search result if the search result is location specific, and/or other information associated with the search result.

Users may navigate between the front face and the back face of a card using a face-flip gesture. Like the reorder gesture, the face-flip gesture may correspond to a defined motion of the device or a defined user-interaction (e.g., defined touch gesture, facial gesture, etc.). The first tab may comprise the second title concurrently with presenting the first card. The first tab may not comprise the second summary. A second tab may comprise the first title concurrently with presenting the second card. The second tab may not comprise the first summary.

Responsive to receiving negative feedback regarding the first search result, the first card may be concealed on the client device, and the first search result of the search result series may be removed to generate an updated search result series. Responsive to receiving a second search string after presenting the search result series, where the second search string similar to the search string, the updated search result series may be presented on the client device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
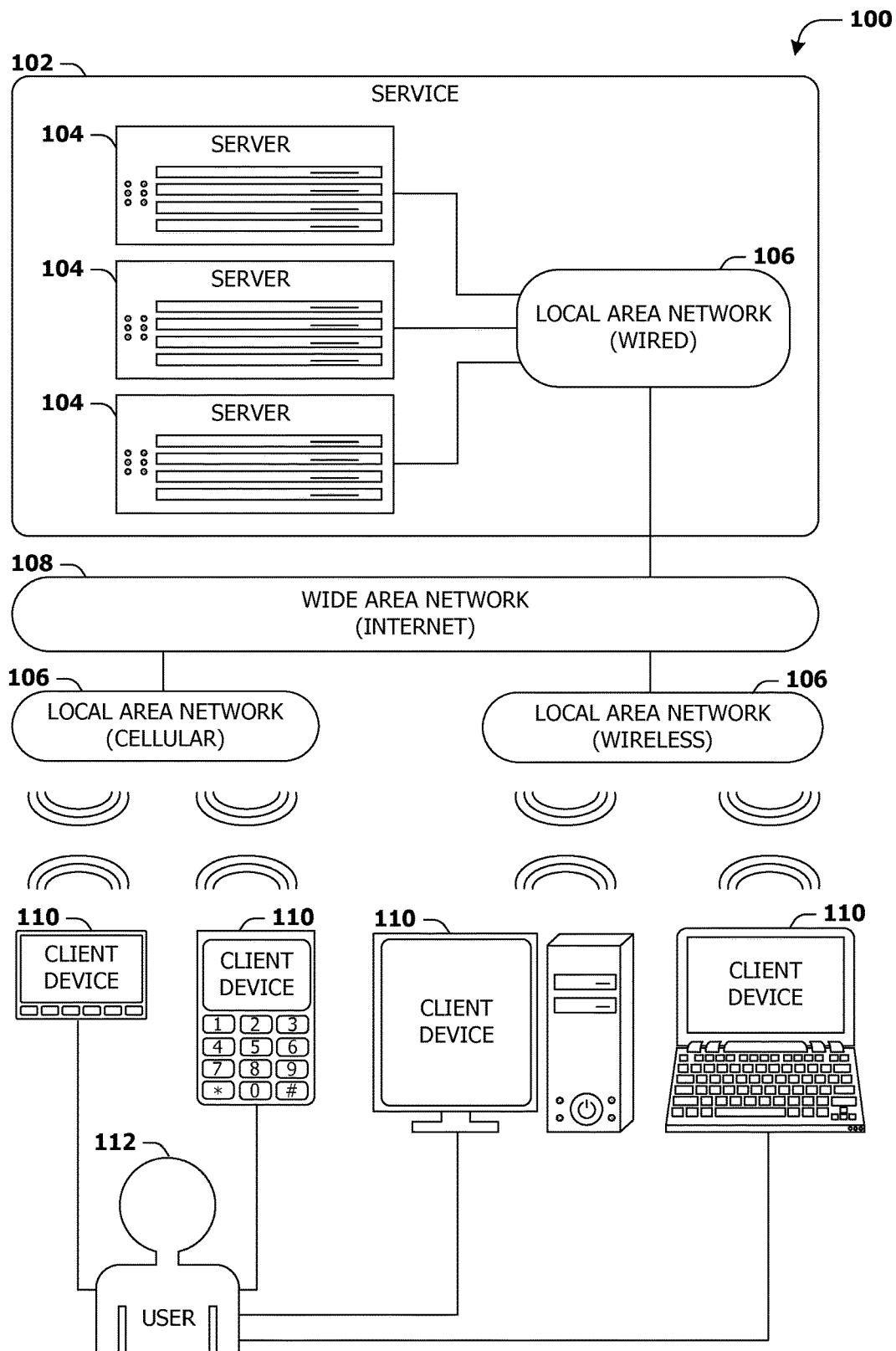
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
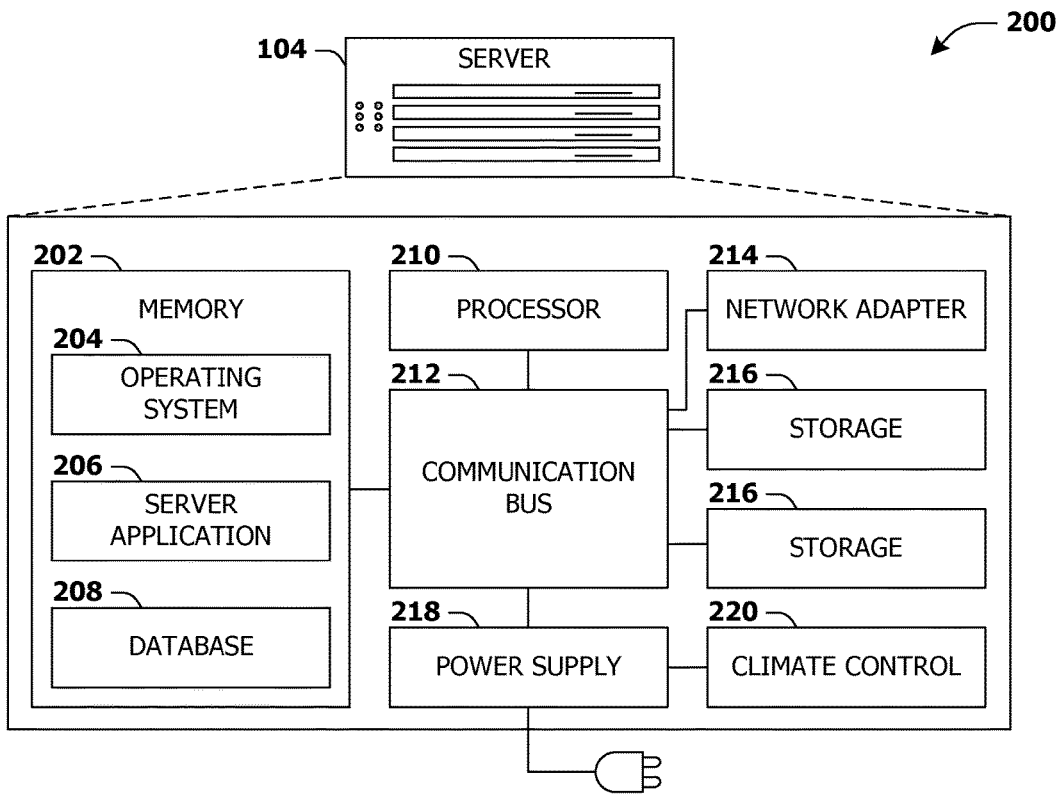
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
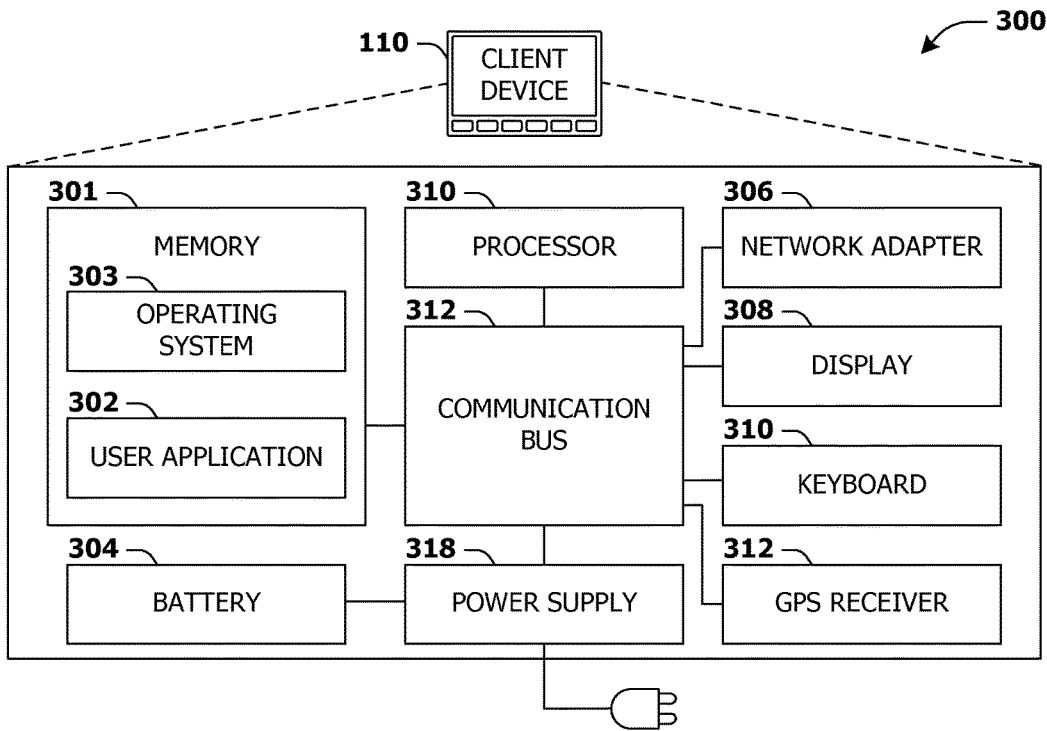
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for graphical interface presentation are provided herein. A user on a client device having initiated a search may be presented with one or more search results. Due to the type of client device upon which the search results are presented (e.g., a mobile device, touch-sensitive device, etc.), the user may find scrolling through the search results using a conventional technique to be tedious. Thus, allowing the user to visualize and interact with respective search results in a card-based format, where respective cards correspond to a search result, and allowing the user to flip through the cards quickly to identify a search result of interest may enrich the user's search experience. Respective cards may occupy all or substantially all of the display and are configured to provide a concise and user friendly experience. The user saves time and energy by having pertinent information readily available without having to go outside of the search results (e.g., the pertinent information for a given search result is on the corresponding card). Having succeeding cards, and thus search results, available through defined gestures, such as touching the client device or moving the client device, eliminates the tedium of scrolling through one or more search results.

The user, having initiated one or more searches that are the same or similar to each other, has the ability to exclude or demote a particular search result from future search result series or promote a particular search result that the user favors (e.g., such that when a second search is performed having a same or similar search string, the promoted search result appears earlier in the rolodex). The ability to, through user feedback, exclude or demote search results (e.g., by associating negative feedback with the search result) or promote search results (e.g., by associating positive feedback with the search result), may increase the user's satisfaction with the search results. Further, computing power required for the search may be reduced because some possible search results are excluded from future search result series, for example.

Figure 4:
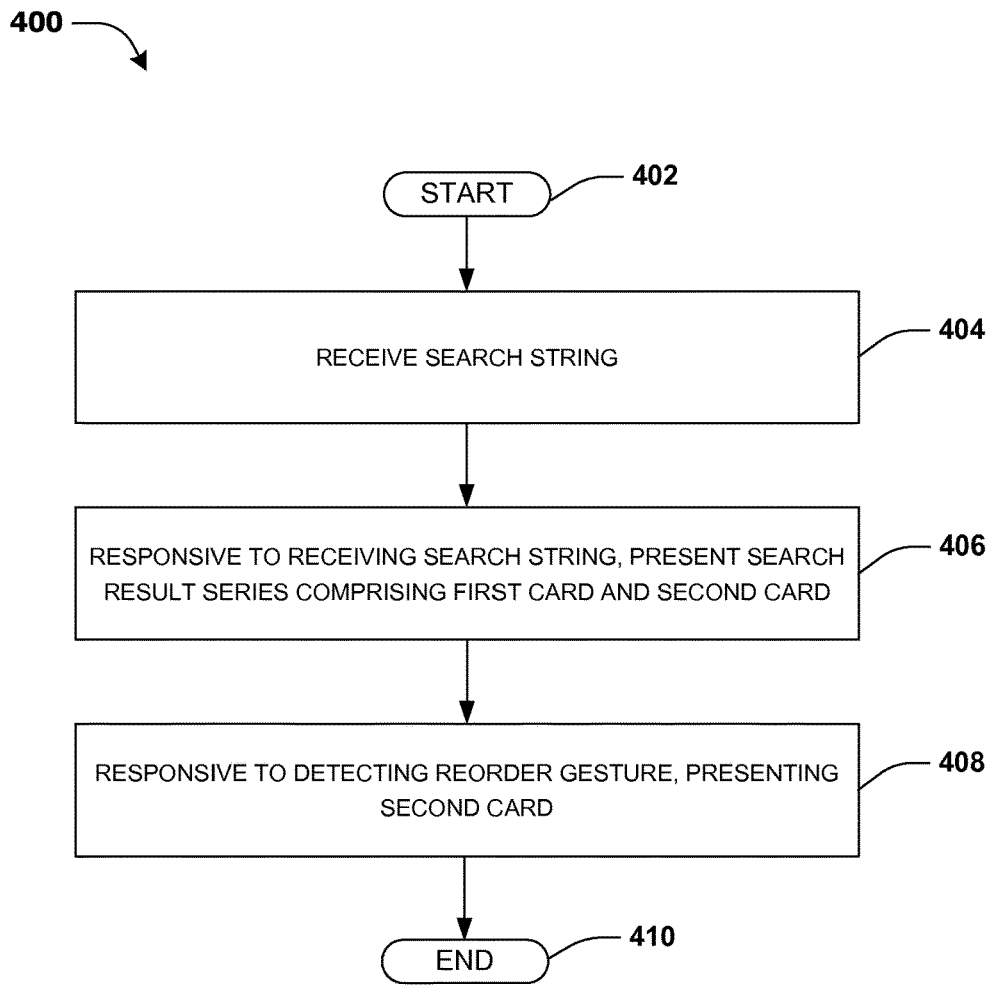
FIG. 4 is a flow chart illustrating an example method of graphical interface presentation.

An embodiment for presenting search results in a card-based graphical interface is illustrated by method 400 of FIG. 4. At 402, the method 400 starts. At 404, a search string may be received. The search string may be generated from textual, visual, audio input by the user and/or may be generated in response to some other triggering event. In an example, the search string may be "Restaurants in New York" or "Automotive repair shops in Ohio." The search query may be input into a website and/or an application configured to perform a search. Further, it may be appreciated that at least some of the search string may be programmatically appended to a user inputted search string. For example, the search string "restaurants" may be formed based upon user input (e.g., the user typed the term restaurants) and the client device may programmatically append "in New York" to the term restaurants because a location-aware component of the device (e.g., a GPS chip) determined that the client device is located in New York.

At 406, responsive to receiving the search string, a search result series may be presented. Search results of the search result series may be presented as cards, where a first card comprises information corresponding to a first search result of the search result series, a second card comprises information corresponding to a second search result of the search result series, etc. For example, the first card may comprise a title associated with a first search result and a summary associated with the first search result. By way of example, in a scenario where the search string was related to restaurants, the title may be a name of a restaurant and a summary may describe a type of food served at the restaurant, hours of operation, reviews, etc. In a scenario where the search string was related to building a deck, the title may be a name of the webpage or name of an article and the summary may provide an overview of the contents of the webpage or the contents of the article.

The information on the cards may be defined by developers of an application or webpage in which the cards are presented, the user of the client device, the content provider corresponding to the search result (e.g., the webpage developer for a webpage being displayed in the search results), etc. For example, in one embodiment, a webpage developer may develop a card for his/her webpage. When a link to the webpage is to be included within the search result series, the card may be retrieved from a database and included in the search result series. In this way, respective webpage developers or other content providers can personalize the card that is to be presented whenever his/her webpage/content is included in a search result series.

In an embodiment, at least some of the cards in a search result series may comprise a front face and a back face, where the front face of the card comprises primary information associated with the search result and the back face of the card comprises additional information associated with the search result. By way of example, the front face of the card may comprise the title and a summary associated with the search result, while a back face of the card may include additional information about the search result such as a menu, a map, pictures, etc. The types of information comprised in the additional information may be dependent upon the types of search results associated with the search result series. For example, where the search result is a restaurant, mechanic, or other venue where reservations are made, the additional information may comprise a reservation feature that facilitates reserving a table or making an appointment. Where the search result is a concert, movie, or other event where tickets are purchased, the additional information may comprise a ticket purchasing feature that enables a user to purchase event tickets through the back face of the card. Where the search result is a service oriented business, the additional information may comprise a menu of services and/or prices for respective services.

Presentation of the front face or the back face of a card may be controlled or triggered using a face-flip gesture. For example, if the front face of a card is presented and the face-flip gesture is received, the card may be flipped to display the back face of the card (e.g., while concealing the front face of the card) and vice-versa. The face-flip gesture may be user-defined or defined by a developer of the application or webpage through which the cards are presented on the client device. Moreover, the face-flip gesture may correspond to a defined motion of the client device and/or may correspond to a defined user motion. For example, in some embodiments, the client device comprises a motion sensing component, such as a gyroscope and/or an accelerometer, and the face-flip gesture corresponds to a defined motion of the client device (e.g., shaking the client device, flipping the client device over, tilting the client device in a defined manner, etc.). In other embodiments, the client device comprises a touch sensitive component and/or an image sensor and the defined motion corresponds to a defined user motion or user input (e.g. touching the first tab, swiping at least one of right, left, up, or down on the display, double tapping the display, etc.).

At 408, responsive to detecting a reorder gesture, the second card may be presented in the forefront, causing the second card to at least partially conceal the first card. The reorder gesture, which is generally distinct from the face-flip gesture, may be user-defined or defined by a developer of the application or webpage through which the cards are presented on the client device. Moreover, the reorder gesture may correspond to a defined motion of the client device and/or may correspond to a defined user motion. At 410, the method 400 ends.

FIGS. 5A-5D illustrate graphical interfaces, also referred to as graphic user interfaces (GUIs), wherein a search string may be received and/or a search result series may be presented. A graphical interface component 508 may be configured to present or render at least some of the graphical interfaces. For example, the graphical interface component 508 may be configured to present or render the search result series as a plurality of cards (e.g., occupying all or substantially all of a display of a client device 502), where respective cards comprises information about a single search result.

Figure 5A:
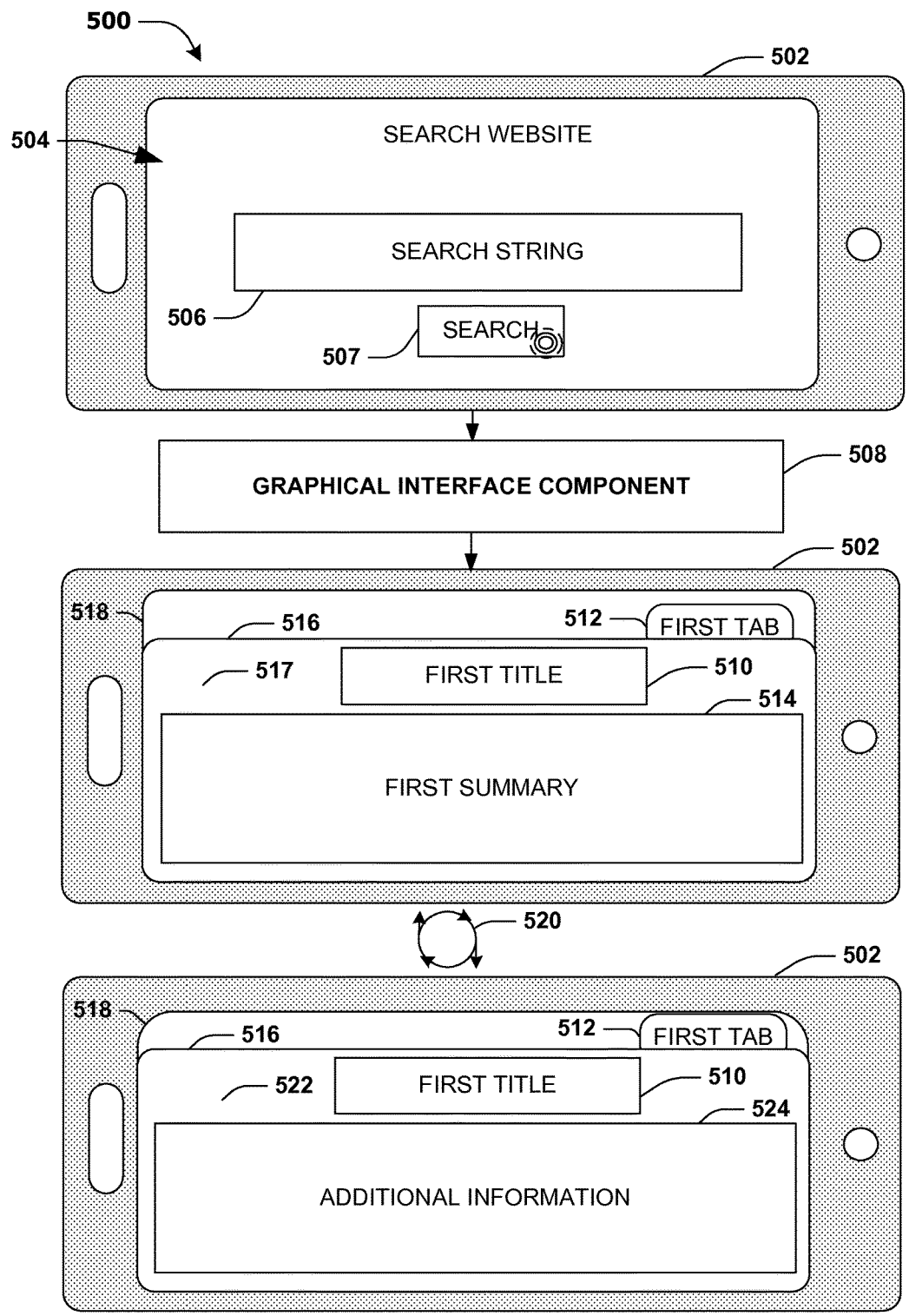
FIG. 5A is a component block diagram illustrating an example system for graphical interface presentation, where a first card of a search result series is presented.

Referring to FIG. 5A, a search string may be generated within a search interface 504 comprising a text field 506 and a search may be performed responsive to a trigger event. For example, the trigger event may correspond to user selecting a search element 507. Responsive to the trigger event, the search string may be transmitted to a search engine, which is configured to perform a search to identify content (e.g., webpages) corresponding to, or relevant to, the search string. The results of the search may be a search result series comprising content corresponding to the search string and/or links to the content and the graphical interface component 508 may be configured to present the search result series in a graphical interface.

For example, upon receipt of the search result series, the graphical interface component 508 may present a first card 516 within a display 518 of the client device 502 while concealing other search results. The first card 516 may comprise a front face 517 and a back face 522, although as described below, the back face 522 may be concealed while the front face 517 is presented within the display 518.

Figure 5B:
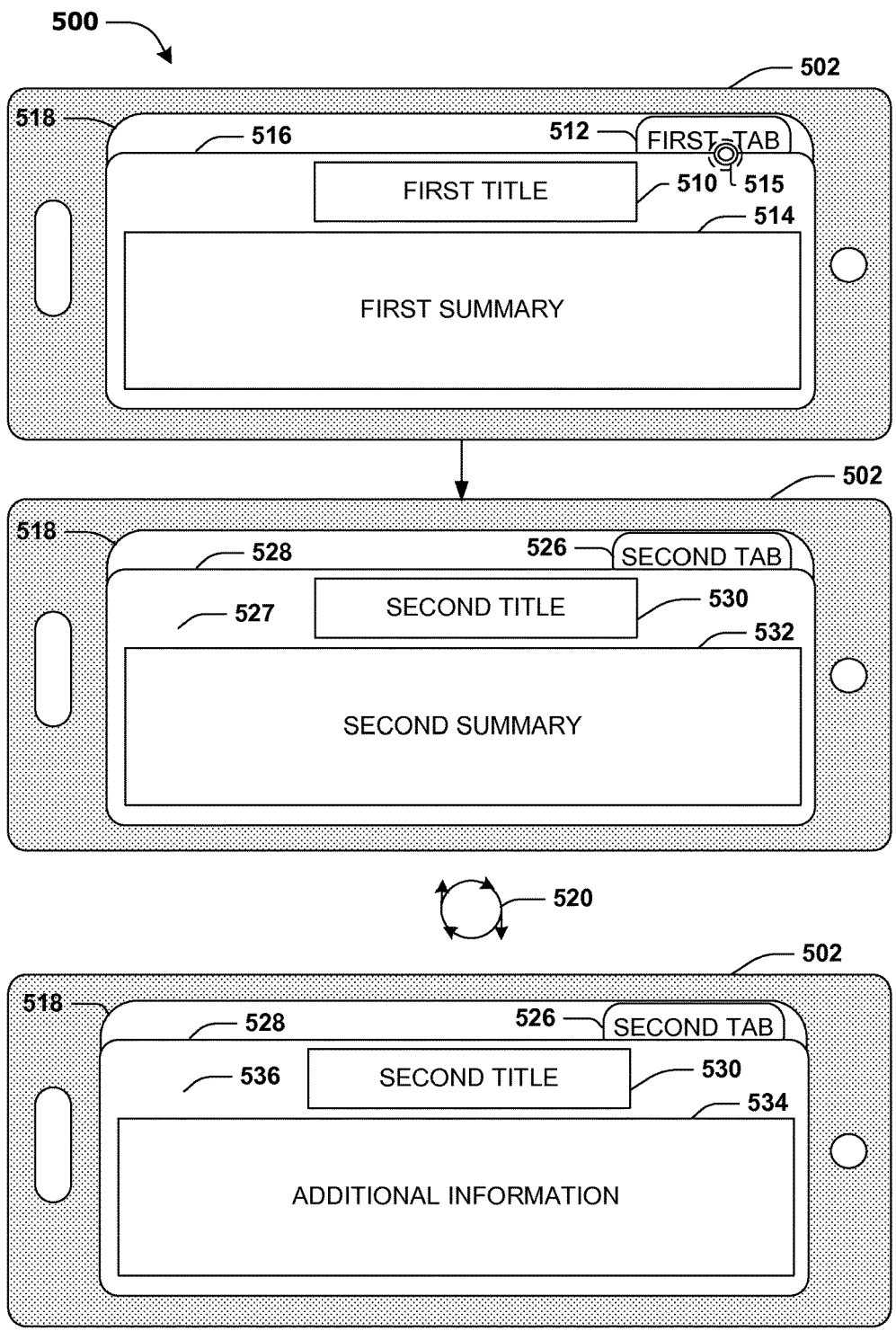
FIG. 5B is a component block diagram illustrating an example system for graphical interface presentation, where a second card of a search result series is presented.

The front face 517 may comprise a first title 510 and a first summary 514 of a first search result of the search result series. In an example, the first summary 514 may comprise pertinent information about the first search result. In an example, the pertinent information may comprise directions, hours of operation, and/or reviews of the first search result. While presenting the first card 516 one or more tabs, such as a first tab 512, may be presented within the graphical interface concurrently with the first card 516, to represent other search results of the search result series (e.g., although cards associated with the other search results remain concealed). In some embodiments, respective tabs represent a different search result and a user may select a tab to view a card associated with the tab. For example, the first tab 512 may represent a second search result of the search result series and a user selection of the first tab 512 may trigger the graphical interface component 508 to display the second card (e.g., while concealing the first card 516) (e.g., as illustrated in FIG. 5B). In some embodiments, the tabs comprise a title of the search result represent by the tab and/or other information that uniquely identifies the search result. For example, the first tab 512 may comprise a title of a second search result.

While displaying the front face 517 and responsive to detecting a face-flip gesture 520, the graphical interface component 508 may present or render the back face 522 of the first card 516. As described above, the face-flip gesture 520 may correspond to a defined motion gesture of the client device 502, a defined motion gesture of a user of the client device 502, a selection of a face-flip element presented within the graphical interface while the front face 517 is being displayed, etc. By way of example, the face-flip gesture may correspond to a defined motion gesture (e.g., FIG. 8 motion) of the client device 502 that is detectable by a motion sensing component, such as a gyroscope and/or an accelerometer, for example. As another example, the face-flip gesture may correspond to a defined user interaction with the display 518 or other element of the client device 502 (e.g., a camera). For example, the face-flip gesture 520 may be defined to be a circle, and thus the graphical interface component 508 may render the back face 522 when a touch-sensitive display of the client device 502 senses the user move his/her finger in a circle on the display 518. As yet another example, the face-flip gesture 520 may correspond to a user interaction with a defined icon on the display 518 (e.g., the user touching a face-flip icon displayed in conjunction with the front face 517).

The back face 522 comprises additional information 524 related to the first search result that is not presented on the front face 517. For example, the back face 522 may comprise a map associated with the first search result, pictures associated with the first search result, customer reviews related to the first search result, a menu related to the first search result, etc. In some embodiments, the back face further comprises at least some information presented on the front face 517, such as a first title 510 of the first search result.

FIG. 5B illustrates how a user may navigate between viewing the first card 516 of the search result series and a second card 528 of the search result series. The second card 528 is presented responsive to detecting a reorder gesture while the first card 516 is presented. The reorder gesture is configured to trigger the graphical interface component 508 to reorder the first card 516 relative to the second card 528, such that the second card 528 is pulled to the forefront while the first card 516 is at least partially concealed by the second card 528.

As described above, the reorder gesture may correspond to a defined motion gesture of the client device 502, a defined motion gesture of a user of the client device 502, a selection of a reorder element presented within the graphical interface while the front face 517 is being displayed, a selection of a tab representing a search result to be displayed, etc. By way of example, the reorder gesture may correspond to a defined motion gesture (e.g., shaking the client device 502) of the client device 502 that is detectable by the motion sensing component, such as the gyroscope and/or the accelerometer, for example. As another example, the reorder gesture may correspond to a defined user interaction with the display 518 or other element of the client device 502 (e.g., a camera). For example, the reorder gesture may be defined to be a cross, and thus the graphical interface component 508 may render the second card 528 when a touch-sensitive display of the client device 502 senses the user move his/her finger in a cross on the display 518. As yet another example, the reorder gesture 520 may correspond to a user interaction with a defined icon on the display 518. For example, as shown in FIG. 5B, the graphical interface component 528 may be configured to reorder the cards (e.g., to render the second card 528 on the display 518) responsive to a user selection of the first tab 512, which represents the second search result when the first card 516 is presented.

The second card 528 may comprise a front face 527 and a back face 536. The second card 528 may comprise the second title 530 of the second search result and a second summary 532 of the second search result. The second summary 532 may be on the front face 527 of the second card 528. In an example, the second summary 532 may comprise pertinent information about the second search result. While presenting the front face 527 of the second card 528 and responsive to detecting the face-flip gesture 520, the back face 536 of the second card 528 may be displayed. Additional information 534 may be presented on the back face 536 of the second card 528. In an example, the additional information 534 may comprise information not included on the front face 527 of the second card 528. While presenting the second card 528, a second tab 526 representing the first search result may be concurrently presented. In some embodiments, the graphical interface may reorder the cards, causing the first card 516 to be presented in the foreground and/or causing the second card 528 to be at least partially concealed by the first card 516, responsive to a user selection of the second tab 526, for example.

Figure 5C:
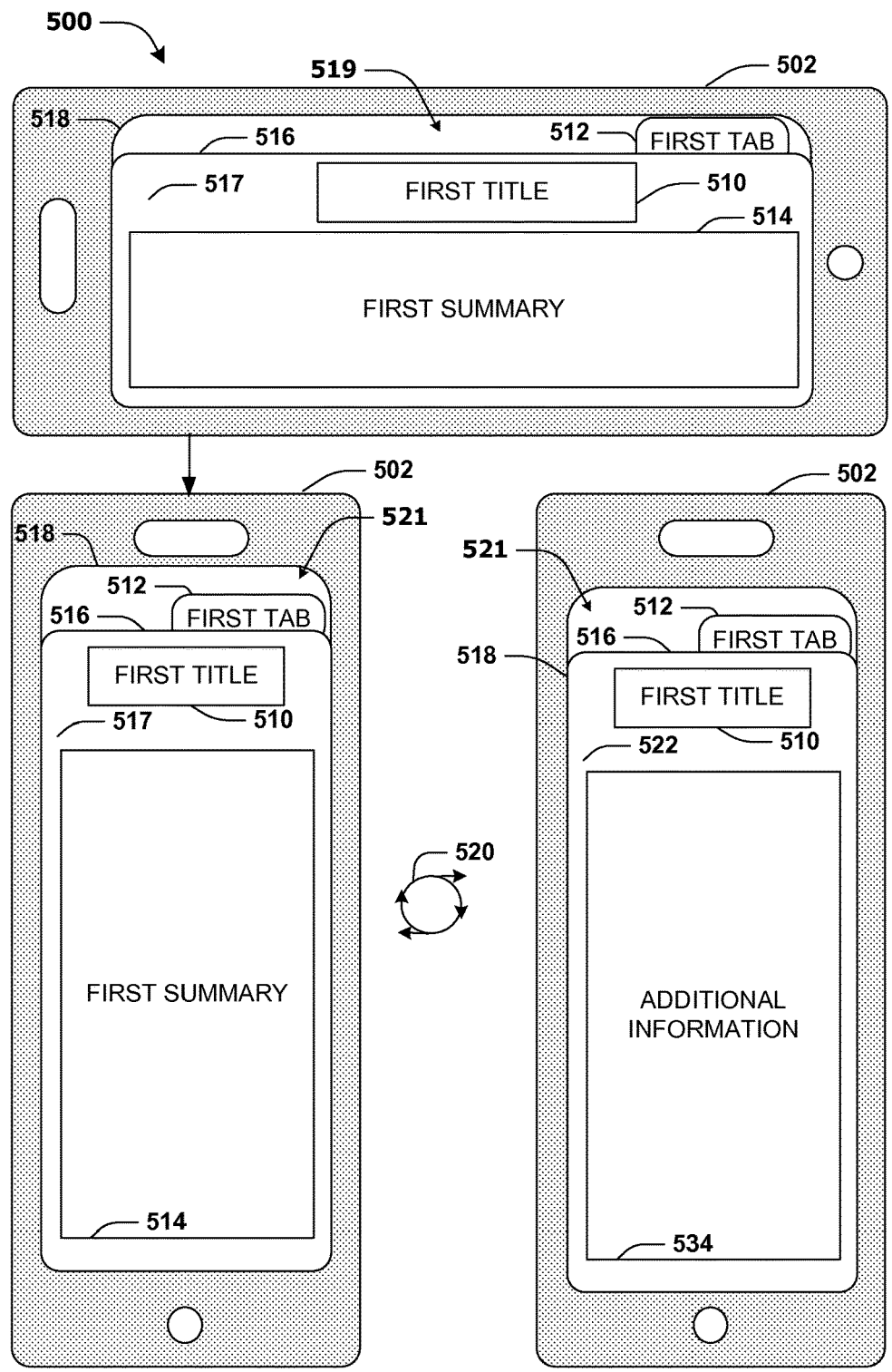
FIG. 5C is a component block diagram illustrating an example system for graphical interface presentation, where a first mode and a second mode are presented.

In some embodiments, the graphical interface component 508 may be configured to present the cards differently depending upon an orientation of client device 502. Referring to FIG. 5C, graphical representations of the first card 516 are illustrated for different modes of the graphical interface component 508, where a first mode 519 corresponds to a landscape mode and a second mode 521 corresponds to a portrait mode. Responsive to detecting an orientation shift of the client device 502, the graphical interface component 508 may shift from the first mode 519 to the second mode 521 or from the second mode 521 to the first mode 519. The orientation shift of the client device 502 may be detected by the motion sensing component of the client device 502. Responsive to the graphical interface component 508 being in the first mode 519, a first portion of the first summary 514 may be displayed when the first card 516 is presented on the display 518. Responsive to the graphical interface component 508 being on the second mode 521, a second portion of the first summary 514 may be displayed when the first card 516 is presented on the display 518. The first portion and the second portion may be at least one of the same or different. Where the first portion and the second portion are different, the difference may be responsive to space restraints attributable to a change in available screen space (e.g., portrait mode may not accommodate as many characters from left to right and thus the same text may occupy a greater percentage of the display space, thus the first summary 514 may be shorter in portrait mode).

While presenting the front face 517 of the first card 516 in the second mode 521 and responsive to detecting the face-flip gesture 520, the back face 522 of the first card 516 in the second mode 521 may be displayed. While presenting the back face 522 of the first card 516 in the second mode 521 and responsive to detecting the face-flip gesture 520, the front face 527 of the first card 516 in the second mode 521 may be displayed.

Figure 5D:
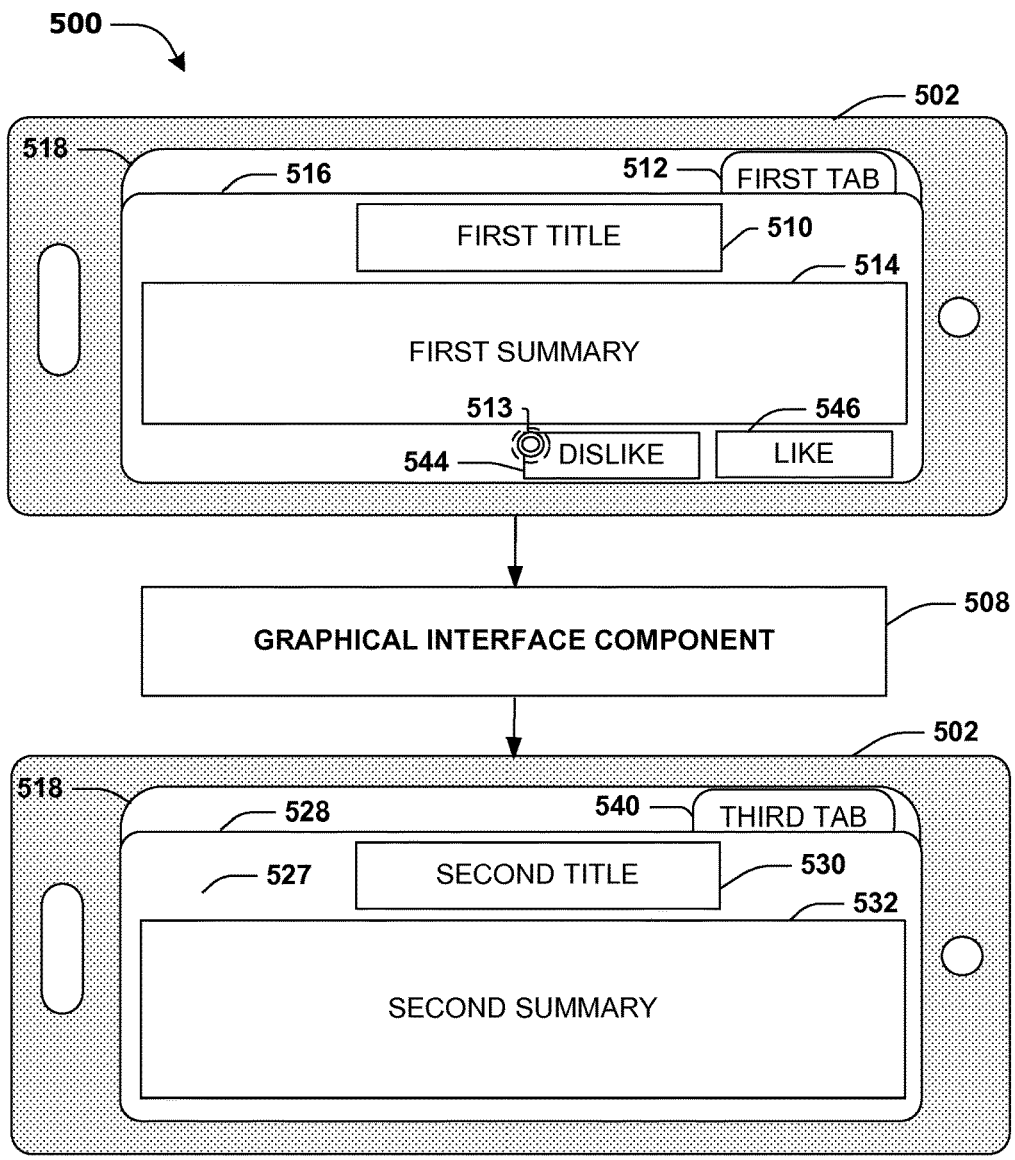
FIG. 5D is a component block diagram illustrating an example system for graphical interface presentation, where a first card receives negative feedback.

In some embodiments, a user may modify future search result series based upon search results presented within a presently displayed search result series. FIG. 5D illustrates an example where the first card 516 receives negative feedback. The first card 516 may include an option for the user to give positive feedback (e.g., selecting a like element 546) or to give negative feedback (e.g., selecting a dislike element 544). Responsive to the user selecting 513 the dislike element 544 for the first search result of the search result series, the graphical interface component 508 may receive the negative feedback regarding the first search result. Responsive to receiving the negative feedback, the graphical interface component 508 may remove the first search result from the search result series to generate an updated search result series and may delete the first card 516, triggering the graphical interface component 508 to display the second card 528.

Responsive to the user selecting 513 the like element 546 for the first search result of the search result series, the graphical interface component 508 may receive the positive feedback regarding the first search result. Responsive to receiving the positive feedback, the graphical interface component 508 may generate an updated search result series and may retain the first card 516 having the first search result. Responsive to the user selecting 513 the like element 546 for the second search result of the search result series, the graphical interface component 508 may receive the positive feedback regarding the second search result. Responsive to receiving the positive feedback, the graphical interface component 508 may generate an updated search result series and may promote the second search result to the first card 516.

When future search strings are received that are similar in content to the search string that generated the search result series, the updated search result series may be returned (e.g., the first search result is not retrieved when a search is performed using the future search string).

Figure 6A:
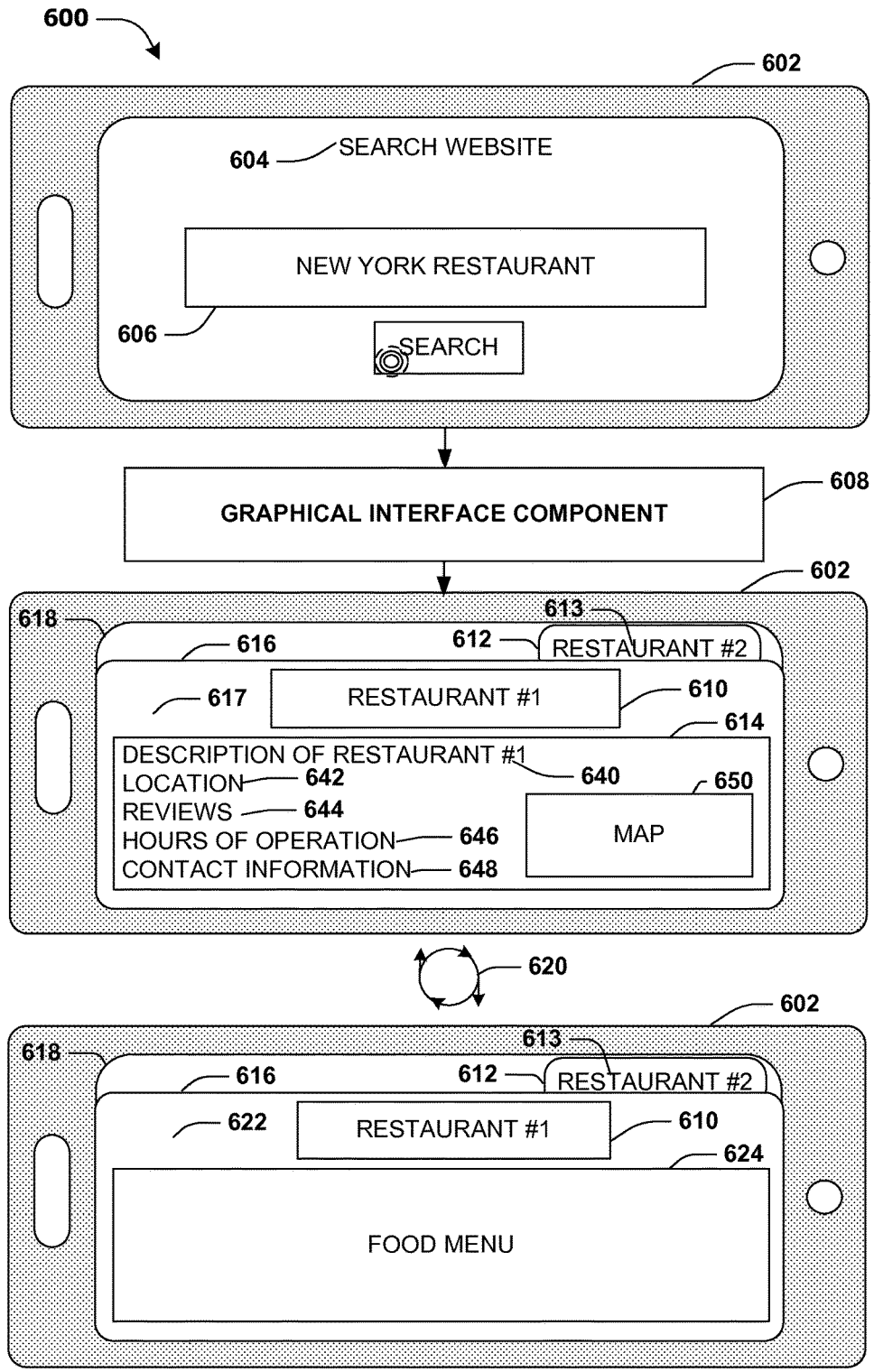
FIG. 6A is a component block diagram illustrating an example system for graphical interface presentation, where an example first card is presented.

FIG. 6A illustrates an example flow when a first search is performed. A user on a client device 602 may want to know about restaurants in New York and generate a search string comprising New York Restaurant 606. The user may input New York Restaurant 606 into a search website 604 and a search result series may be returned to the client device 602.

A graphical interface component 608 may present the search result series as a group of cards on a display 618 of the client device 602, where a first card 616 is associated with a first search result, a second card is associated with a second search result, etc.

The first card 616 may comprise a front face 617 and a back face 622. The front face 617 may comprise Restaurant #1 610 as a first title of the first search result. The front face 617 may comprise a first summary 614. The first summary 614 may comprise a description of the Restaurant #1 640, a location 642 of the Restaurant #1, reviews 644 of the Restaurant #1, hours of operation 646 of the Restaurant #1, contact information 648 of the Restaurant #1, and/or a map 650 showing the location of the Restaurant #1. The description of the Restaurant #1 640 may include a type of food served, an atmosphere of the Restaurant #1, and/or a price point of the Restaurant #1. The location 642 of the Restaurant #1 may include the address of the Restaurant #1. The reviews 644 of the Restaurant #1 may include reviews from one or more websites that allow a patron of the Restaurant #1 to generate and publish an opinion of a quality of service, a quality of food, the quality of food v. a price of the food, and/or an appearance of the Restaurant #1. The hours of operation 646 of the Restaurant #1 may include one or more times and days of the week the Restaurant #1 opens, one or more times and days of the week the Restaurant #1 closes, and/or one or more dates on which the Restaurant #1 is closed. The contact information 648 of the Restaurant #1 may include a phone number of the Restaurant #1, a website of the Restaurant #1, a facsimile number of the Restaurant #1, and/or an email address of the Restaurant #1. The map 650 showing the location 642 of the Restaurant #1 may include a thumbnail map with a link to a mapping/direction website.

While presenting the first card 616, a first tab 612 may be concurrently presented representing a second search result. The first tab 612 may comprise a second title of the second search result, such as Restaurant #2 613. A second card associated with the second search result may be at least partially concealed by the first card 616. In an example, the second card may include the same or similar information about Restaurant #2 as displayed on the first card 616 about Restaurant #1.

While displaying the front face 617 and responsive to detecting a face-flip gesture 620, the back face 622 of the first card 616 may be displayed. The back face 622 of the first card 616 may comprise the first title (e.g., Restaurant #1 610) and additional information about the first search result, such as a food menu 624 of Restaurant #1. The food menu 624 may include a list of foods and/or drink that the Restaurant #1 serves. While presenting the back face 622 of the first card 616 and responsive to detecting the face-flip gesture 620, the front face 617 of the first card 616 may be redisplayed.

Figure 6B:
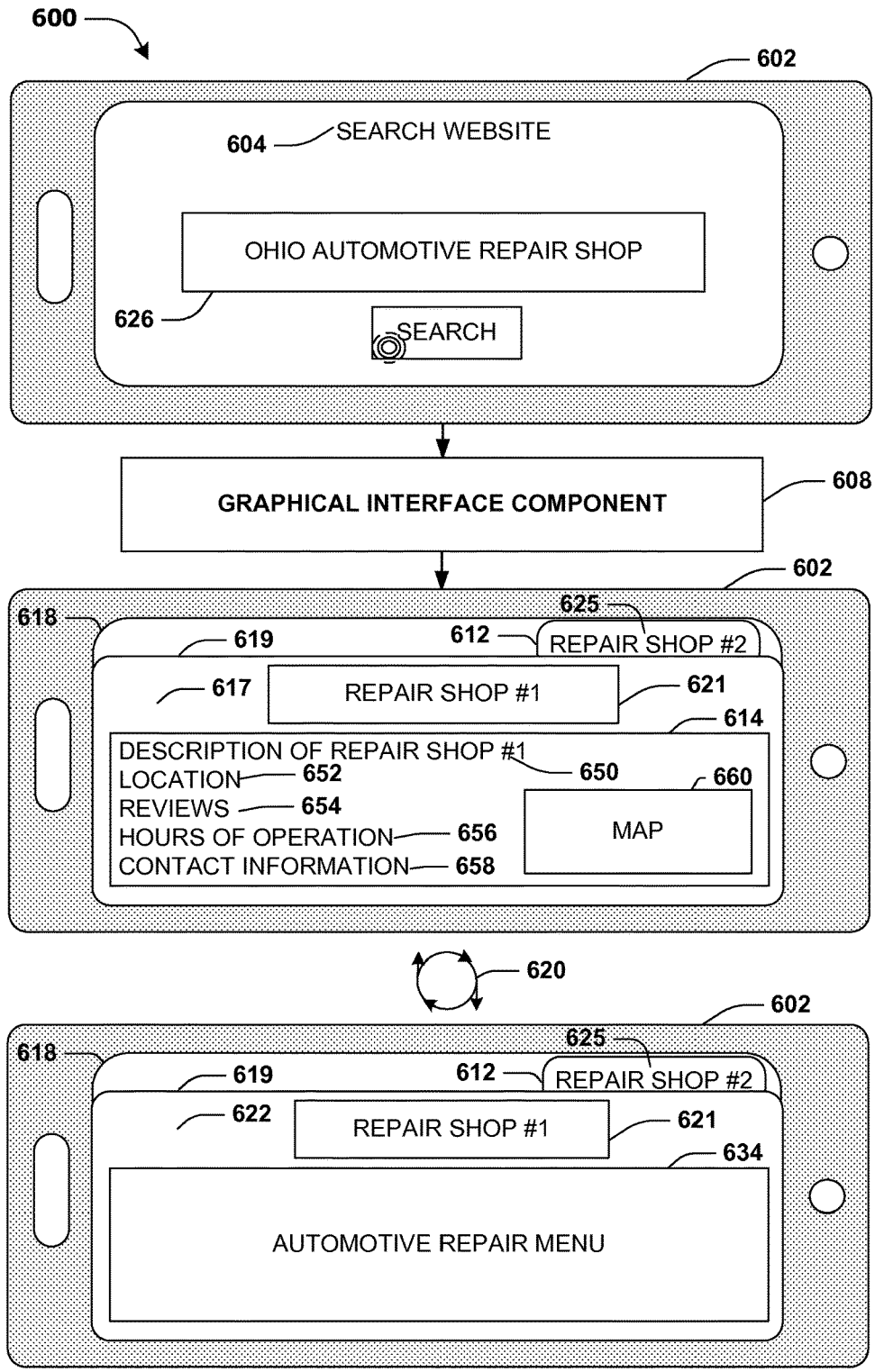
FIG. 6B is a component block diagram illustrating an example system for graphical interface presentation, where an example first card is presented.

FIG. 6B illustrates an example flow when a second search is performed. The user on the client device 602 may generate a search string comprising Ohio Automotive Repair Shop 626 because he/she has an inoperable car in Ohio. The user may input Ohio Automotive Repair Shop 626 into the search website 604 and a search results series may be returned to the client device 602. The graphical interface component 608 may present the search result series as a group of cards on the display 618, where a first card 619 is associated with a first search result, a second card is associated with a second search result, etc.

The first card 619 may comprise the front face 617 and a back face 622. The front face 617 may comprise Repair Shop #1 621 as the first title of the first search result. The front face 617 may comprise the first summary 614. The first summary 614 may comprise a description of the Repair Shop #1 650, a location 652 of the Repair Shop #1, reviews 654 of the Repair Shop #1, hours of operation 656 of the Repair Shop #1, contact information 658 of the Repair Shop #1, and/or a map 660 showing the location 652 of the Repair Shop #1. The description of the Repair Shop #1 650 may include a type of automotive services offered, and/or a price point of the Repair Shop #1. The location 652 of the Repair Shop #1 may include an address of the Repair Shop #1. The reviews 654 of the Repair Shop #1 may include reviews from one or more websites that allow a patron of the Repair Shop #1 to generate and publish an opinion of a quality of service, the quality of service v. a price of the service, and/or an appearance of Repair Shop #1. The hours of operation 656 of the Repair Shop #1 may include one or more times and days of the week the Repair Shop #1 opens, one or more times and days of the week the Repair Shop #1 closes, and/or one or more dates on which the Repair Shop #1 is closed. The contact information 658 of the Repair Shop #1 may include a phone number of the Repair Shop #1, a website of the Repair Shop #1, a facsimile number of the Repair Shop #1, and/or an email address of the Repair Shop #1. The map 660 showing the location of the Repair Shop #1 may include a thumbnail map with a link to a mapping/direction website.

While presenting the first card 619, a first tab 612 may be concurrently presented representing a second search result of the search result series. The first tab 612 may comprise a second title of the second search result, such as Repair Shop #2 625. A second card associated with the second search result may be at least partially concealed by the first card 619. In an example, the second card may include the same or similar information about Repair Shop #2 as displayed on the second example first card 619 about Repair Shop #1.

While presenting the front face 617 and responsive to detecting the face-flip gesture 620, the back face 622 of the first card 619 may be displayed. The back face 622 of the first card 619 may comprise the first title (Repair Shop #1 621) and additional information about the first search result, such as an automotive repair menu 634 of Repair Shop #1. The automotive repair menu 634 may include a list of services the Repair Shop # offers. While presenting the back face 622 and responsive to detecting the face-flip gesture 620, the front face 617 of the first card 619 may be redisplayed.

Figure 7:
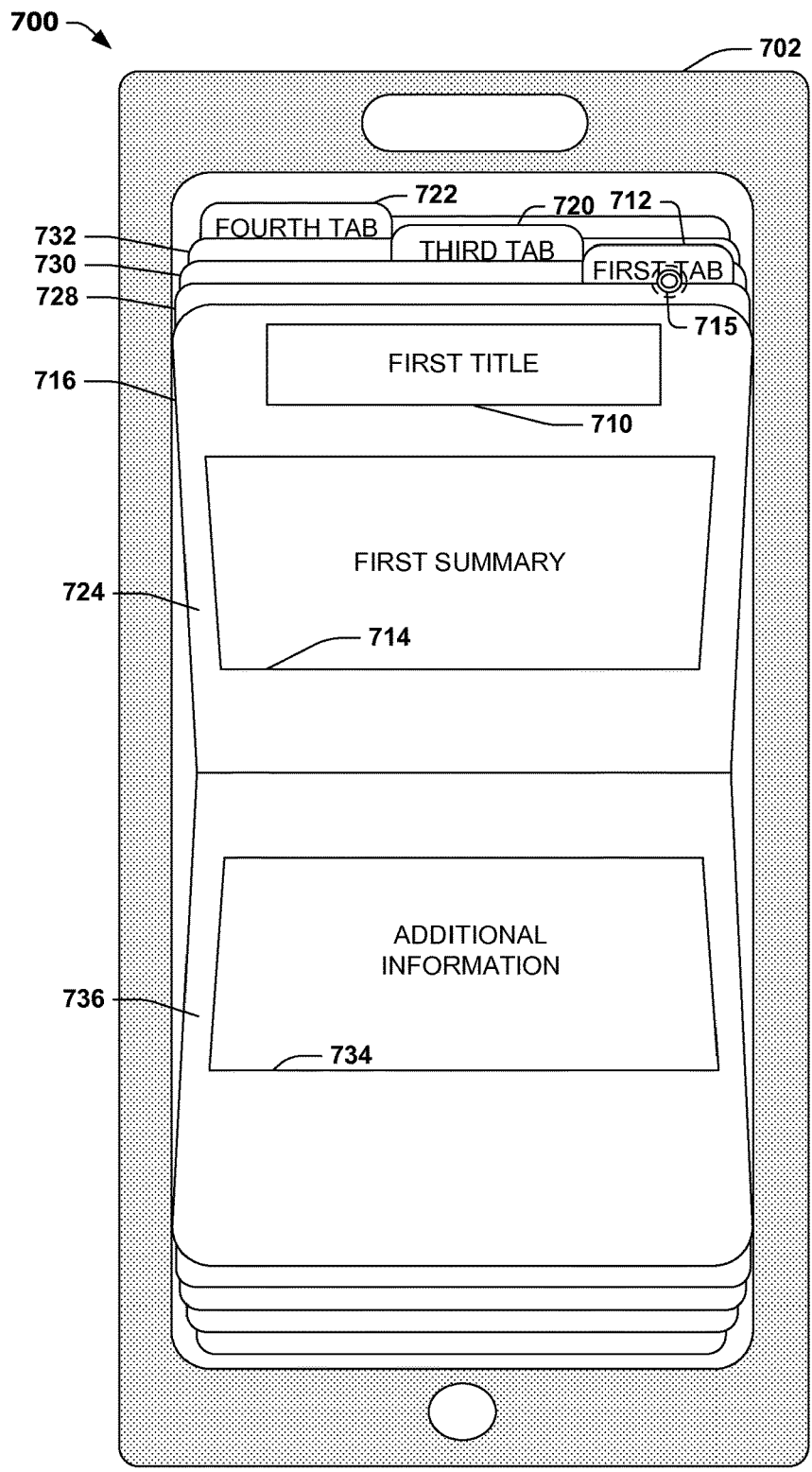
FIG. 7 is a component block diagram illustrating an example system for graphical interface presentation, where an example display is presented.

FIG. 7 illustrates an example system for graphical interface presentation, where an example display is presented. A search result series may be displayed on a client device 702. The search result series may present one or more search results associated with a search string. The search result series may be displayed in a manner similar to a rolodex. The search result series may comprise a first card 716 corresponding to a first search result. The first card 716 may at least partially conceal a second card 728. The second card 728 may correspond to a second search result of the search result series. A first tab 712 comprising a second title of the second search result is presented. The first tab 712 may be visible when the first card 716 is displayed. The first card 716 may at least partially conceal a third card 730 corresponding to a third search result of the search result series. A third tab 720 comprising a third title of the third search result may be presented. The third tab 720 may be visible when the first card 716 is displayed. The first card 716 may at least partially conceal a fourth card 732 corresponding to a fourth search result of the search result series. A fourth tab 722 comprising a fourth title of the fourth search result may be presented. The fourth tab 722 may be visible when the first card 716 is displayed. The first card 716 may comprise a front face 724 and a back face 736. The front face 724 may comprise the first title 710 of the first search result. The front face 724 may comprise a first summary 714 of the first search result. The back face 734 may include additional information 734 about the first search result that may not be included in the first summary 714. A reorder gesture may be detected. The reorder gesture may comprise moving the client device 702 (e.g., shaking the client device 702, flipping the client device 702 over, tilting the client device 702, etc.). The reorder gesture may comprise a defined user interaction 715 with a display of the client device 702. The defined user interaction 715 may comprise touching the display on the client device 702 (e.g. touching the first tab 712, swiping at least one of right, left, up, or down on the display, double tapping the display, etc.). Responsive to the reorder gesture being detected by a motion sensing component, the second card 728 may be displayed. The second card 728 may be displayed by presenting an appearance of the front face 724 flipping down to display a back face of the second card 728 on a back surface of the front face 724 of the first card 716. A second tab (not shown) comprising the first title 710 may be displayed opposite the third tab 720 on the back face of the second card 728.

Figure 8:
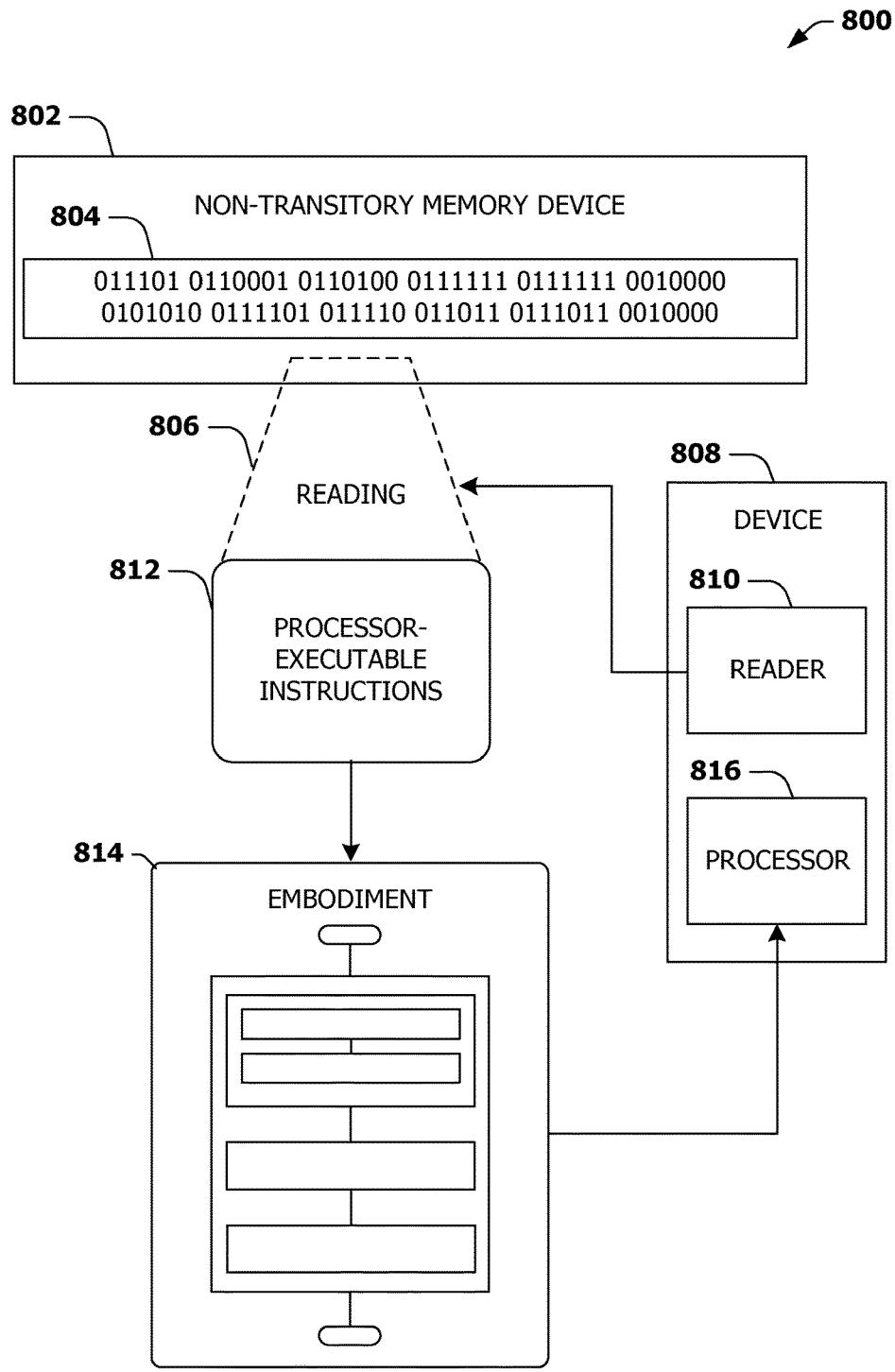
FIG. 8 is an illustration of a scenario featuring an example non-transitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 400 of FIG. 4, for example. In some embodiments, the processor-executable instructions, when executed on the processor 816 of the device 808, are configured to implement a system, such as at least some of the example system 500 of FIGS. 5A-5D, at least some of the example system 600 of FIGS. 6A-6B, and/or at least some of the example system 700 of FIG. 7 for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of graphical interface presentation, comprising:
    receiving a search string;
    generating a search result series, comprising a first search result and a second search result, based upon the search string; and
    responsive to determining that the search string was received from a client device of a mobile touch-sensitive type:
        generating a set of cards for the search result series, the generating a set of cards comprising:
            generating a first card, comprising a first title of the first search result and a first summary of the first search result, for the first search result;
            generating a first tab, comprising the first title of the first search result included in the first card, for the first search result;
            generating a second card, comprising a second title of the second search result and a second summary of the second search result, for the second search result; and
            generating a second tab, comprising the second title of the second search result included in the second card, for the second search result;
        defining a reorder gesture, corresponding to a defined motion of the client device, for navigation through the set of cards; and
        presenting the search result series in a card-based graphical interface to a user on the client device responsive to the receiving, the presenting the search result series comprising:
            concurrently presenting, at a first time, (i) a single card for a single search result comprising the first card for the first search result and (ii) the second tab for the second search result, without presenting the first tab for the first search result;
            detecting the reorder gesture at a second time after the first time; and
            responsive to the detecting the reorder gesture, concurrently presenting, at a third time after the second time, (i) a single second card for a single second search result comprising the second card for the second search result and (ii) the first tab for the first search result, without presenting the second tab for the second search result.

2. The method of claim 1, the first card not comprising titles of other search results of the search result series different than the first search result and not comprising summaries of other search results of the search result series different than the first search result.

3. The method of claim 2, the second card not comprising titles of other search results of the search result series different than the second search result and not comprising summaries of other search results of the search result series different than the second search result.

4. The method of claim 1, the detecting comprising:
    detecting the reorder gesture via at least one of a gyroscope or an accelerometer of the client device.

5. The method of claim 1, the detecting comprising:
    detecting a defined user interaction with a display of the client device.

6. The method of claim 1, the presenting the search result series comprising:

concurrently presenting a third tab of a third search result with the presenting the first card and the second tab.

7. The method of claim 1, the presenting the first card comprising presenting a front face of the first card, and the presenting the search result series comprising:
   detecting a face-flip gesture during the presenting the first card; and
   displaying a back face of the first card responsive to the detecting a face-flip gesture during the presenting the first card, the back face comprising additional information corresponding to the first search result.

8. The method of claim 7, the presenting the second card comprising presenting a front face of the second card, and the presenting the search result series comprising:
   detecting the face-flip gesture during the presenting the second card; and
   displaying a back face of the second card responsive to the detecting a face-flip gesture during the presenting the second card, the back face comprising additional information corresponding to the second search result.

9. The method of claim 1, comprising:
   receiving negative feedback regarding the first search result;
   concealing the first card corresponding to the first search result from display on the client device; and
   removing the first search result of the search result series to generate an updated search result series.

10. The method of claim 9, comprising
    receiving a second search string after the presenting the search result series, the second search string similar to the search string; and
    presenting the updated search result series on the client device responsive to the receiving a second search string.

11. A system for graphical interface presentation, comprising:
    a processor; and
    memory comprising processor-executable instructions that when executed by the processor cause implementation of a graphical interface component configured to:
        generate a search result series, comprising a first search result and a second search result, based upon a search query;
        responsive to determining that the search string was received from a client device of a mobile type:
            generate a set of cards for the search result series, the generating a set of cards comprising:
                retrieving a first card, comprising a first title of the first search result and a first summary of the first search result, for the first search result from a first database of the first search result;
                generating a first tab, comprising the first title of the first search result included in the first card, for the first search result;
                retrieving a second card, comprising a second title of the second search result and a second summary of the second search result, for the second search result from a second database of the second search result, the first database different than the second database; and
                generating a second tab, comprising the second title of the second search result included in the second card, for the second search result; and
            define a reorder gesture, corresponding to a defined motion of the client device, for navigation through the set of cards; and
        present the search result series in a card-based graphical interface to a user on the client device, the presenting the search result series comprising:
            concurrently presenting, at a first time, (i) a single card for a single search result comprising the first card for the first search result and (ii) a the second tab for the second search result;
            detecting the reorder gesture at a second time after the first time; and
            responsive to the detecting the reorder gesture, concurrently presenting, at a third time after the second time, (i) a single second card for a single second search result comprising the second card for the second search result and (ii) the first tab for the first search result.

12. The system of claim 11, the first card comprising a front face and a back face and the graphical interface component configured to:
    present the back face of the first card responsive to a face-flip gesture, the back face comprising additional information corresponding to the first search result.

13. system of claim 11, the first card not comprising a third title and a third summary of a third search result different than the first search result, and the second card not comprising a fourth title and a fourth summary of a fourth search result different than the second search result.

14. The system of claim 11, where the client device comprises a motion sensing component configured to detect the defined motion.

15. The system of claim 14, the motion sensing component comprising at least one of a gyroscope or an accelerometer.

16. The system of claim 15, the motion sensing component configured to display the search result series in at least one of a first mode corresponding to a landscape mode or a second mode corresponding to a portrait mode.

17. The system of claim 11, the graphical interface component configured to:
    display, within the first card, a first portion of the first summary responsive to the client device being in a first mode; and
    display, within the first card, a second portion of the first summary responsive to the client device being in a second mode.

18. A non-transitory computer readable medium comprising computer executable instructions that when executed by a processor perform a method for automated search intent discovery, comprising:
    receiving a search string; and
    presenting a search result series to a user on a client device responsive to the receiving, the presenting a search result series comprising:
        presenting a first card comprising a first search result of the search result series but not another search result of the search result series, the first card retrieved from a first database of the first search result and comprising:
            a first title of the first search result; and
            a first summary of the first search result;
        presenting a second tab comprising a second title of a second search result included in a second card different than the first card;
        detecting a reorder gesture corresponding to a defined motion of the client device configured to trigger a reordering of the first card relative to the second card;

presenting the second card responsive to the detecting the reorder gesture, the second card comprising the second search result of the search result series and the second title of the second search result included in the second tab, the second card retrieved from a second database of the second search result, the first database different than the second database; and presenting a first tab responsive to the detecting the reorder gesture, the first tab comprising the first title of the first search result included in the first card.

19. The non-transitory computer readable medium of claim 18, the presenting a first card comprising presenting a front face of the first card, and the presenting a search result series comprising:

detecting a face-flip gesture during the presenting a first card; and displaying a back face of the first card responsive to the detecting a face-flip gesture during the presenting a first card, the back face comprising additional information corresponding to the first search result.

20. The non-transitory computer readble medium of claim 19, the presenting a second card comprising presenting a front face of the second card, and the presenting a search result series comprising:

detecting the face-flip gesture during the presenting a second card; and displaying a back face of the second card responsive to the detecting a face-flip gesture during the presenting a second card, the back face comprising additional information corresponding to the second search result.

\* \* \* \* \*